United States Patent [19]

Ookouchi et al.

[11] Patent Number: 5,711,613
[45] Date of Patent: Jan. 27, 1998

[54] SLIDE STRUCTURE AND CONTINUOUS HOT DIPPING APPARATUS HAVING SLIDE STRUCTURE

[75] Inventors: Takahiko Ookouchi; Tamihito Kawahigashi, both of Hitachinaka; Hitoshi Okoshi, Hitachi; Yoshitaka Nakayama, Hitachioota; Junji Sakai, Minori-machi; Mitsuo Nakagawa, Mito, all of Japan

[73] Assignee: Hitachi, Ltd., Tokyo, Japan

[21] Appl. No.: 418,423

[22] Filed: Apr. 7, 1995

[30] Foreign Application Priority Data

Apr. 8, 1994 [JP] Japan .................. 6-070415

[51] Int. Cl.[6] .................................................. F16C 33/02
[52] U.S. Cl. .......................... 384/283; 384/907.1; 384/913
[58] Field of Search ................... 384/907.1, 913, 384/902, 277, 283, 911, 279, 98; 242/548; 226/168, 190, 194

[56] References Cited

U.S. PATENT DOCUMENTS

| | | | |
|---|---|---|---|
| 3,938,868 | 2/1976 | Van Wyk | 384/913 |
| 4,934,837 | 6/1990 | Kawamura | 384/907.1 |
| 5,072,689 | 12/1991 | Nakagawa et al. | 118/419 |
| 5,252,130 | 10/1993 | Ookouchi et al. | 118/423 |

FOREIGN PATENT DOCUMENTS

| | | | |
|---|---|---|---|
| 55-72917 | 6/1980 | Japan | 384/907 |
| 62-56619 | 3/1987 | Japan | 384/907.1 |
| 0159813 | 7/1987 | Japan | 384/907.1 |
| 0193620 | 4/1989 | Japan | 384/907.1 |
| 3177552 | 1/1991 | Japan . | |
| 0478320 | 3/1992 | Japan | 384/907.1 |
| 9103581 | 3/1991 | WIPO . | |

*Primary Examiner*—Brenda A. Lamb
*Attorney, Agent, or Firm*—Antonelli, Terry, Stout, & Kraus, LLP

[57] ABSTRACT

A slide structure comprises a roll shaft and a roll bearing. A whole circumference of the roll shaft is made of a sintered ceramics body. A sliding surface of the roll bearing is constructed by inserting a cermet into a carbon-carbon reinforcing graphite member. A continuous hot dipping apparatus has a roll supported and rotated in a molten metal bath. A sliding surface of the roll shaft and the roll bearing employs the slide structure. The corrosion resistivity and the wearing resistivity can be improved and a long service life can be attained. The slide structure comprised of the roll shaft and the roll bearing can be smoothly rotated by decreasing the friction coefficient of the slide structure.

18 Claims, 4 Drawing Sheets

SLIDE STRUCTURE AND CONTINUOUS HOT DIPPING APPARATUS HAVING SLIDE STRUCTURE

BACKGROUND OF THE INVENTION

1. Field of the Invention

The present invention relates to a slide structure and a continuous hot dipping apparatus having a slide structure, and more particularly to a slide structure and a continuous hot dipping apparatus having a slide structure having an excellent characteristic against the corrosion wearing with a molten metal and the wearing due to the load of a roll shaft provided on an end portion of a roll.

The slide structure mainly comprises a roll bearing unit commonly having a pair of shafts (a pair of roll shafts) provided on both end portions of a roll and a pair of bearing members (a pair of roll bearings) for supporting the pair of roll shafts.

The present invention relates to a slide structure and a continuous hot dipping apparatus having a slide structure, and more particularly to a slide structure in which by improving the bearing member (the roll bearing) structure of the slide structure a sliding portion formed between the roll shaft and the roll bearing can be smoothly rotated in accordance with the decrease a friction coefficient.

2. Prior Art

From the past, stainless steel, high chromium steel, super-hard steel or the like having the good corrosion resistivity is used as a material for a roll bearing in a continuous hot dipping apparatus in a form of an overlay member manufactured by the welding work or a sleeve member.

However, there is a problem in that the plating characteristic is extremely degraded by the vibrations of the roll shaft and the continuous hot dipping apparatus due to the backlash and play formed between the roll shaft and the roll bearing, because the material is abraded in nearly one week, for example, in a molten zinc dipping bath.

This reason has been clarified that it is difficult to completely eliminate the corrosion wearing with a molten metal such as the molten zinc even if a metal having a comparatively excellent corrosion resistibility such as stainless steel, high chromium steel, super-hard steel and so on is used.

The corrosion wearing by the molten metal takes place as well as the friction wearing during the sliding portion of the roll bearing unit to lead to increase an amount in the friction wearing.

Especially, when the corrosion progresses a certain degree, the friction wearing is accelerated by an occurrence of corrosion pits on the sliding surface formed between the roll shaft and the roll bearing in the slide structure.

Therefore, in order to decrease the amount of wearing in the roll bearing unit, it is necessary to select a material having an excellent corrosion resistibility against the molten metal.

From this standpoint, there are prepared some ceramics members which are hardly affected by the corrosion wearing of the molten metal. Such ceramics members are most suitable materials for the roll shaft of the roll bearing unit in the continuous hot dipping bath.

The inventors of the present invention have proposed a roll bearing unit in a slide structure for a continuous hot dipping apparatus combining a sintered ceramics body as the material for the roll shaft and a carbon-carbon reinforcing graphite member as the material for the roll bearing, such a roll bearing unit in the slide structure is disclosed, for example, in Japanese patent laid-open No. 3-177,552 (1991).

In this prior technique, the sintered ceramics body is fit to an outer periphery surface of the roll shaft through a metallic buffer member and the carbon-carbon reinforcing graphite member is provided on an inside periphery surface of the roll bearing.

In the above stated prior technique, the combination of the sintered ceramics body employed in the roll shaft and the carbon-carbon reinforcing graphite member employed in the roll bearing does not take the problem of an actual operation in a continuous hot dipping apparatus into consideration.

In other words, there has been revealed an entirely new problem in that in the continuous hot dipping apparatus. Namely, there exists an intermetallic compound produced by reaction of Fe eluted from a steel strip and so on with the molten metal such as Fe—Zn, Fe—Al and the like and ZnO and $Al_2O_3$ produced in the early time of the operation of the continuous hot dipping apparatus.

The intermetallic compound accelerates the wearing of the carbon-carbon reinforcing graphite member of the material for the roll bearing and further increases the friction coefficient in the sliding portion of the sintered ceramics body of the material for the roll shaft.

SUMMARY OF THE INVENTION

An object of the present invention is to provide a slide structure and a continuous hot dipping apparatus having a slide structure wherein the corrosion resistivity and the wearing resistivity can be heightened in a combination of a sintered ceramics body employed in a roll shaft and a reinforcing graphite member such a carbon-carbon reinforcing graphite member employed in a roll bearing.

Another object of the present invention is to provide a slide structure and a continuous hot dipping apparatus having a slide structure wherein a long service life can be attained in a combination of a sintered ceramics body employed in a roll shaft and a reinforcing graphite member such a carbon-carbon reinforcing graphite member employed in a roll bearing.

A further object of the present invention is to provide a slide structure and a continuous hot dipping apparatus having a slide structure wherein between a roll shaft and a roll bearing constituted in the slide structure can be smoothly rotated by decreasing the friction coefficient of a sliding portion formed between the roll shaft and the roll bearing.

A further object of the present invention is to provide a slide structure and a continuous hot dipping apparatus having a slide structure wherein a little roll rotating vibration caused by the rotation of a roll and a roll shaft constituted in the slide structure can be obtained.

The above stated objects of the present invention can be attained by providing a slide structure having a roll bearing unit which comprises a roll shaft and a roll bearing, wherein a whole circumference of a sliding portion of the roll shaft is made of a sintered ceramics body, and the sliding surface of the roll bearing being constructed by inserting a cermet into a reinforcing graphite member such as a carbon-carbon reinforcing graphite member.

The above stated objects of the present invention can be attained by providing a continuous hot dipping apparatus having a roll shaft supported with a roll bearing to rotate in a hot dipping bath, wherein a whole circumference of a sliding portion of the roll shaft of a roll is made of a sintered ceramics body, and a sliding surface of the roll bearing being constructed by inserting a cermet into a reinforcing graphite member such as a carbon-carbon reinforcing graphite member.

According to the present invention, a continuous hot dipping apparatus has a sink roll and a support roll supported with a roll bearing and rotating in a hot dipping bath, wherein a whole circumference of a sliding portion of a roll shaft of at least one of the sink roll and the support roll is made of a sintered ceramics body, and a sliding surface of the roll bearing being constructed by inserting a cermet into a reinforcing graphite member such as a carbon-carbon reinforcing graphite member.

According to the present invention, a continuous hot dipping apparatus has a sink roll and a support roll supported with a roll bearing and rotating in a hot dipping bath, wherein a whole circumference of a sliding portion of the roll shaft of the support roll is made of a sintered ceramics body, a sliding surface of the roll bearing being constructed by inserting a cermet into a reinforcing graphite member such as a carbon-carbon reinforcing graphite member, and the support roll rotating without any external driving unit.

In accordance with the present invention described above, the sintered ceramics body employed in the roll shaft is one selected from a group of one or more of sialon, silicon nitride, silicon carbide, alumina, aluminum nitride, zirconia, boron nitride and cermet.

In accordance with the present invention described above, the cermet is formed by sintering at least one kind of a material having a high melting point and high hardness selected from a group of one or more of metal carbides, metal nitrides, metal borides, metal oxides and metal silicides with one selected from a group of a metal or an alloy.

By using the sintered ceramics body for the sliding portion of the roll shaft and the carbon-carbon reinforcing graphite member for the sliding surface of the roll bearing, the corrosion wearing in the molten metal can be prevented.

Since the carbon-carbon reinforcing graphite member employed in the roll bearing has an excellent solid lubricating capability and a sufficient mechanical strength, the friction coefficient in the sliding movement with the sintered ceramics body employed in the roll shaft is extremely small and is less than 0.1 and the limitation of surface pressure can be substantially increased above 50 kgf/cm$^2$.

However, in the hot dipping bath, there is generated a very hard intermetallic compound such as Fe—Zn or Fe—Al by reacting Fe eluted from a steel strip and the like with the molten metal.

Entering of the intermetallic compound in the sliding surface formed between the roll shaft and the roll bearing increases not only the wearing of the comparatively soft carbon-carbon reinforcing graphite member by the abrasion wearing phenomenon but increases the wearing and the friction coefficient.

This occurs since the hard intermetallic compound attaches to a ceramics sliding surface of the roll shaft to increase its surface roughness largely.

In accordance with the present invention, in order to solve the above stated problems, the cermet is partially added on the sliding surface of the roll bearing in addition to the reinforcing graphite member such as the carbon-carbon reinforcing graphite member.

As the material of the ceramics member used in the sliding portion of the roll shaft, sialon is most preferable, but SiC, Si$_3$N$_4$, Al$_2$O$_3$, ZrO$_2$, AlN, BN and cermet may be applicable.

The cermet is formed by sintering at least one kind of a material having a high melting point and high hardness selected from a group of one or more of metal carbides, metal nitrides, metal borides, metal oxides and metal silicides with one selected from a group of a metal or an alloy.

Especially, the cermet composed of molybdenum boride and Ni is preferable. Most of the matrix of the cermet becomes a three-element compound of B—Mo—Ni by controlling the contained amount of Ni and the sintering temperature, and the corrosion resistivity against the molten metal substantially increases to suppress the corrosion wearing.

Further, the hardness of the cermet can be controlled to Hv=700–1400. In the combination with the ceramics member, by making the hardness of the cermet smaller than the hardness of the ceramics member by at least 20%, a sticking during the sliding movement at a high surface pressure (larger than 50 kgf/cm$^2$) can be prevented and the abrasion wearing by the intermetallic compound such as Fe—Al and Fe—Zn can be also prevented since the cermet is harder than the intermetallic compound.

As described above, by partially arranging the cermet on the sliding surface of the roll bearing in addition to the carbon-carbon reinforcing graphite member, it is possible to prevent the wearing of the abrasion wearing type due to the intermetallic compound such as Fe—Zn and Fe—Al in the hot dipping bath.

Similarly, it is possible to prevent the wearing due to the surface roughness of the sliding surface of the roll shaft since the intermetallic composition attached on the ceramics sliding surface of the roll shaft can be removed according to the finishing effect.

A further additional advantage is that since the cermet has the good wetness against the molten metal, the lubrication effect by the molten metal improves the wearing resistivity without increasing the friction coefficient.

By making the above stated cermet composed of molybdenum boride and Ni in such that the most part consists of the three-element boride compound of B—Mo—Ni, the corrosion wearing can be suppressed since the cermet has the excellent corrosion resistivity against the molten metal. The friction coefficient can be decreased lower than 0.2 since the cermet has the good wetness against the molten metal.

The oxide cermet used is composed of at least one selected from a group of one or more of ZrO$_2$, Al$_2$O$_3$, BeO, MgO and TiO$_2$ and a metal or an alloy selected from at least one of Fe, Ni and Co.

And also the cermet which is the above cermet further added with an alloy element selected from a group of one or more of Cr, Mo, W, Ti, Zr, Hf, Nb, Al and so on is used. It is preferable that the amount of the added element except for Cr is less than 5 wt %, besides the amount of the added Cr is less than 30 wt %.

The carbide cermet used is a combination of at least one selected from a group of one or more of WC, TaC, NbC, VC, ZrC, Mo$_2$C and TiC and the metal or the alloy described above.

The nitride cermet used is at least one of a group of one or more of BN, Si$_3$N$_4$, AlN, TiN and ZrN. The boride cermet used is at least one of a group of one or more of ZrB$_2$, Cr$_2$B, TiB$_2$, HfB$_2$, NbB$_2$, Mo$_2$O$_5$ and W$_2$B$_5$. The silicide cermet used is at least one of a Group of one or more of Ti silicide, Zr silicide, Hf silicide, V silicide, Nb silicide, Mo silicide and W silicide.

The containing amount of the ceramics member in the cermet is preferably more than 50 wt %, and particularly it is preferable to be 60–90 wt %. For the borides described above, it is preferable to contain the boride composition nearly 100%.

DESCRIPTION OF THE INVENTION

Figure 1:
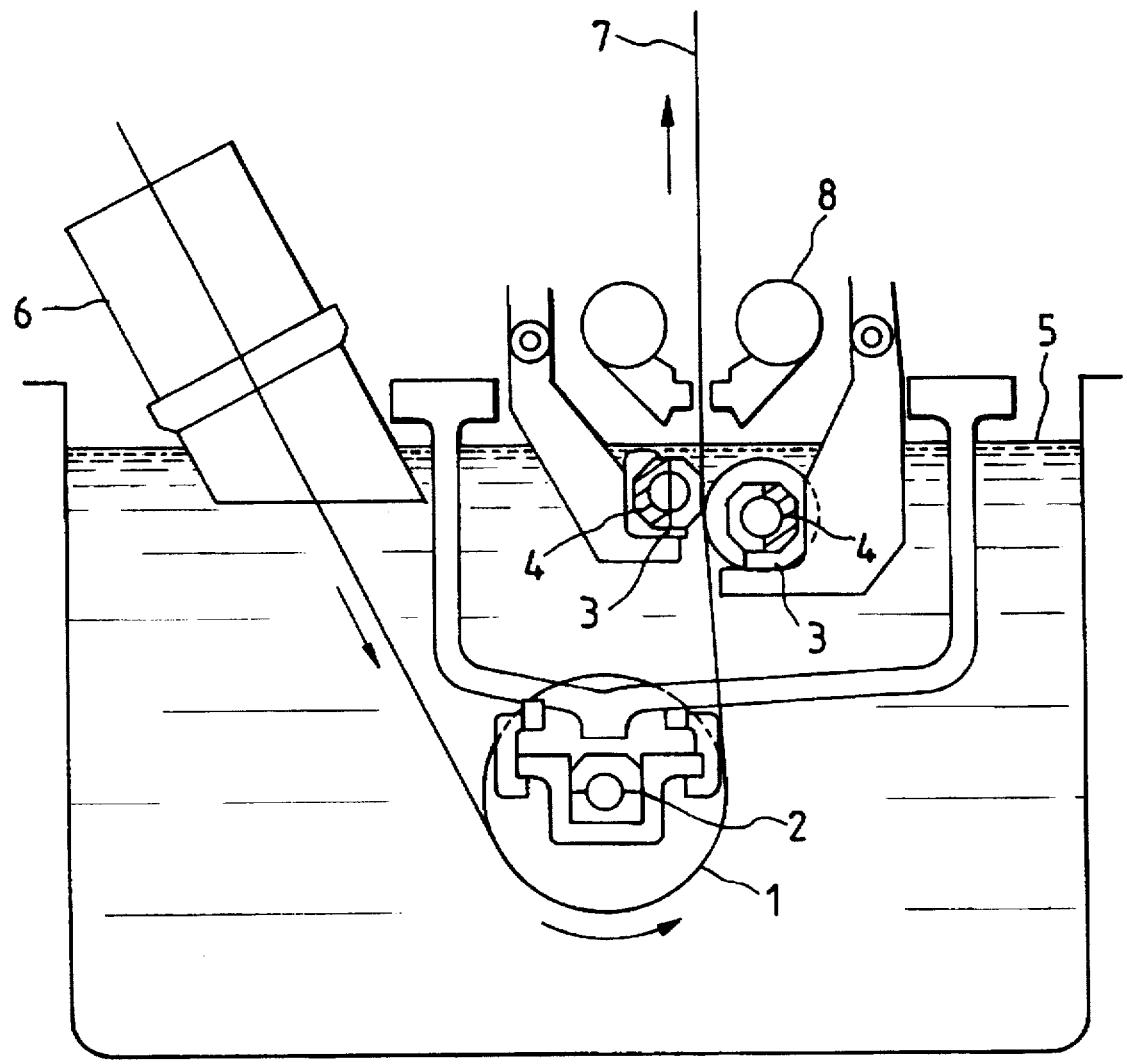
FIG. 1 is a cross-sectional schematic view showing one embodiment of a continuous molten zinc dipping apparatus having a slide structure according the present invention.

Hereinafter, various embodiments of a slide structure employed in a continuous hot dipping apparatus according to the present invention will be explained referring to the drawing.

Embodiment 1

FIG. 1 is a cross-sectional view showing a continuous molten zinc dipping apparatus having a slide structure according to the present invention.

In FIG. 1, a steel strip 7 supplied through a snout 6 is turned in its direction by a sink roll 1 in a dipping bath 5, and a pair of support rolls 3 prevent the steel strip 7 from deforming and vibrating. The steel strip 7 runs at a high speed of 20 to 200 m/minute.

Further, the steel strip 7 extracted from the dipping bath 5 is blown with high speed gas flows from a pair of gas swiping nozzles 8 provided on both sides of the steel strip 7. The thickness of attached plating is regulated by adjusting the gas pressure and the angle of the blowing flow of the gas swiping nozzle 8.

Both of the sink roll 1 and the support rolls 3 described above have a sliding type roll bearing unit 2 and sliding type roll bearing units 4 in the slide structure to be rotatable respectively.

Figure 2:
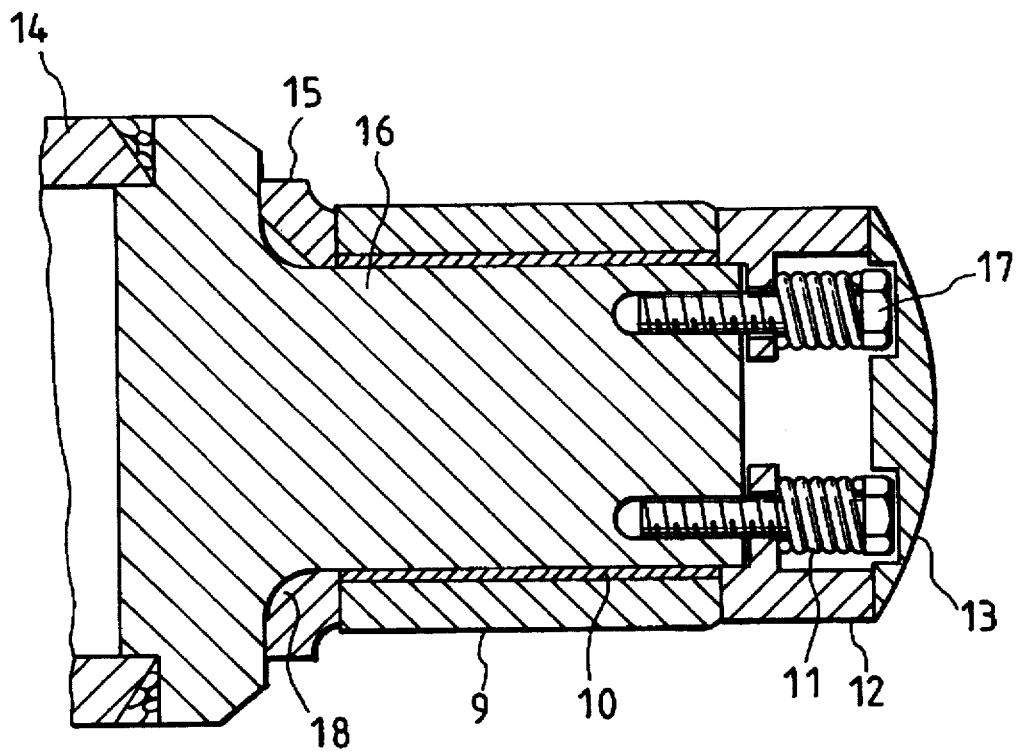
FIG. 2 is an enlarged cross-sectional view showing a roll shaft portion of a sink roll of the continuous molten zinc dipping apparatus having the slide structure shown in FIG. 1.

FIG. 2 is an enlarged cross-sectional view showing a roll shaft of the sliding type roll bearing unit portion of the sink roll 1 in the slide structure according to the present invention.

In FIG. 2, sialon ceramics member is selected as a material for a cylindrical ceramics member 9 attached to a metallic roll shaft 16, the sialon ceramics member has a high corrosion resistivity against the molten zinc and also has a high strength and high hardness property.

The chemical equation for the sialon is expressed by $Si_{6-z}Al_zO_zN_{8-z}$, where z may be an arbitrary value from 0 to 4.2, which is called as β-sialon ceramics.

In this embodiment, the sialon ceramics member is fabricated by using sialon powders having z=0.5, kneading them through a wet method using methanol after adding a little amount of binder, and then granulating through a spray dry method.

Next, a cylindrical pressed powder compacting body is fabricated through a cold press method. After a degreasing treatment process, the obtained pressed powder compacting body is sintered at 1750° C. in a nitrogen atmosphere so as to obtain a sintered sialon body 9.

A sintered sialon body 9 is machined to form in an outer diameter of 165 mm and a length of 150 mm using a diamond grinder.

Stainless steel having a comparatively high corrosion resistibility is used for the metallic roll shaft 16. In order to protect the cylindrical sintered sialon body 9 from the thermal expansion difference between the metallic roll shaft 16 and the cylindrical sintered sialon body 9, the metallic roll shaft 16 is wrapped with a stainless pipe made of SUS 316 which acts as a buffer member 10.

Then the metallic roll shaft 16 is inserted into the cylindrical sintered sialon body 9 and a pushing member 12 made of SUS 316L is pushed and fixed to an end edge portion of the cylindrical sintered sialon body 9 using a spring member 11 made of Inconel 750 and bolts 17 made of SUS 316L.

Further, a thrust plate 13 made of SUS 316L is welded and fixed as shown in the figure to prevent the molten zinc from entering into a buffer member 10.

The main body portion 14 of the sink roll 1 is cylindrical and welded to the metallic roll shaft 16 to form a one-piece structure. An intermediate body 15 composed of a metallic ring is inserted between the cylindrical sialon body 9 and the metallic roll shaft 16.

In a neck portion of the metallic roll shaft 16 there is provided a space 18 to securely fix the cylindrical sintered sialon body 9. The cylindrical sintered sialon body 9 may be formed in a one-piece structure or in a structure separable into two (2) to four (4) pieces.

Figure 3:
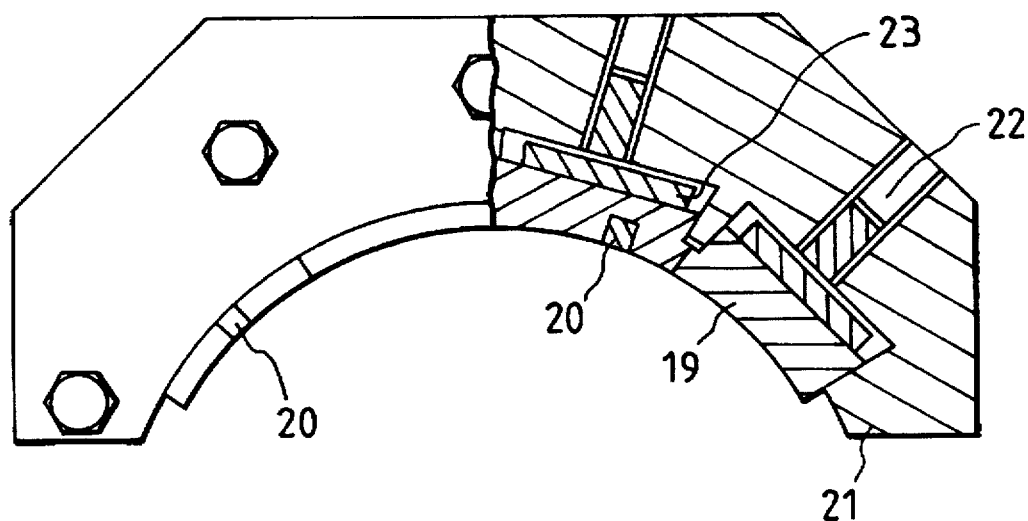
FIG. 3 is a partially cross-sectional enlarged side view showing a roll shaft bearing portion of a sink roll of the continuous molten zinc dipping apparatus having the slide structure shown in FIG. 1.
Figure 4:
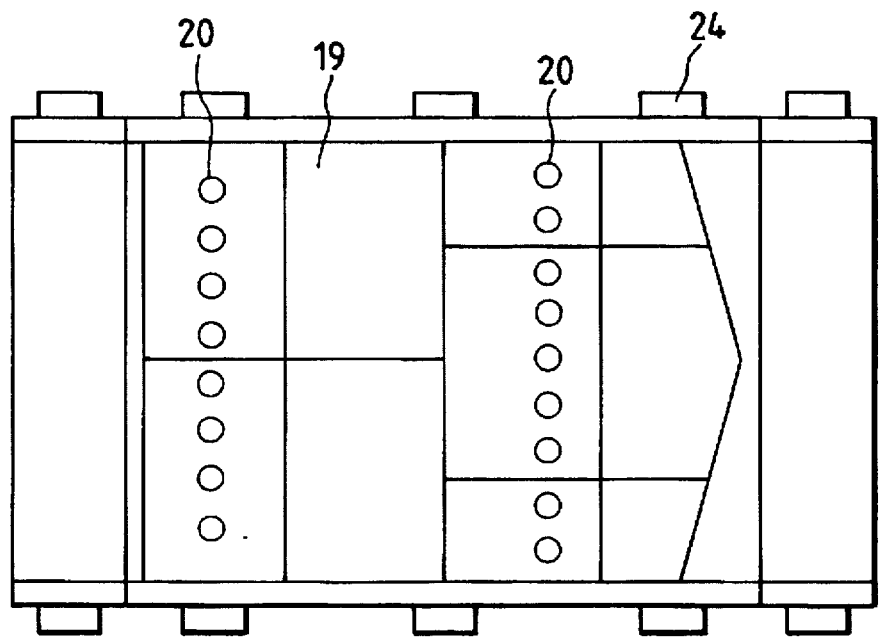
FIG. 4 is a front view showing an inner surface of the roll shaft bearing portion of the sink roll of the continuous molten zinc dipping apparatus having the slide structure shown in FIG. 3.

FIG. 3 is a partially cross-sectional enlarged side view showing the roll bearing of the roll shaft. FIG. 4 is a front view showing an inner surface the roll bearing of the roll shaft of FIG. 3.

In FIG. 3, ten (10) pieces of the carbon-carbon reinforcing graphite members 19 which form sliding surfaces of the bearing are arranged in dent portions formed in dovetail grooves on the inner surface of a metal casing 21 made of SUS 316L arranging four rows to an axial direction as shown in figure.

And seventeen (17) pieces of a cylindrical cermet members 20 having a diameter of 5 mm made of molybdenum boride and Ni are arranged as shown in the figure.

An inner periphery of the sliding surface of the roll bearing is machined in a semi-circle shape as shown in the figure. The reason why the carbon-carbon reinforcing graphite members 19 in the right-half side are arranged three (3) rows to a peripheral direction is because the construction is chosen such that the arranged positions of the cermet members 20 in the right hand side and the left hand side are not come to the same positions on the peripheral direction.

The reason why the carbon-carbon reinforcing graphite members 19 are formed in a swept-back shape seeing from the middle portion of the roll shaft is to prevent the dross from entering.

The carbon-carbon reinforcing graphite members 19 are pushed and fixed to the metal casing 21 so as to contact to each other on their inner periphery. The carbon-carbon reinforcing graphite member 19 is made of a graphite sintered body containing carbon fibers having diameter of 1–10 μm by the amount of 50 volume %.

The pushing metal plate 23 is for pushing and fixing the carbon-carbon reinforcing graphite members 19 to the inner surface side using a bolt 22.

The cermet is a sintered body composed of molybdenum boride and Ni containing nickel of 35 wt %. The obtained cermet bodies 20 having special sizes ranging from 3–10 mm in a diameter and 5–20 mm in a length are formed into a cylindrical shape and then implanted or fit into the carbon-carbon reinforcing graphite members 19 described above to form a portion of the sliding surface with the graphite members. Thus, the members 19 serve as base members for the cermet bodies 20, surfaces of the two forming sliding surface of the bearing.

The cermet bodies 20 are arranged in two rows as shown in FIG. 4 in such as not to come to the same positions on the peripheral direction.

In the slide structure of this embodiment, a whole circumference of the sliding portion of the rotor shaft is made by the sintered ceramics body (the cylindrical sintered sialon body) 9 and a sliding surface of the rotor bearing is constituted by partially inserting the cermet body 20 into the carbon-carbon reinforcing graphite member 19.

Namely, in the sliding surface of the rotor bearing in the slide structure the cermet body 20 is partially exposed at the surface with a form of a block in the carbon-carbon graphite reinforcing member 19 and arranged to be surrounded by the carbon-carbon graphite reinforcing member 19.

Figure 5:
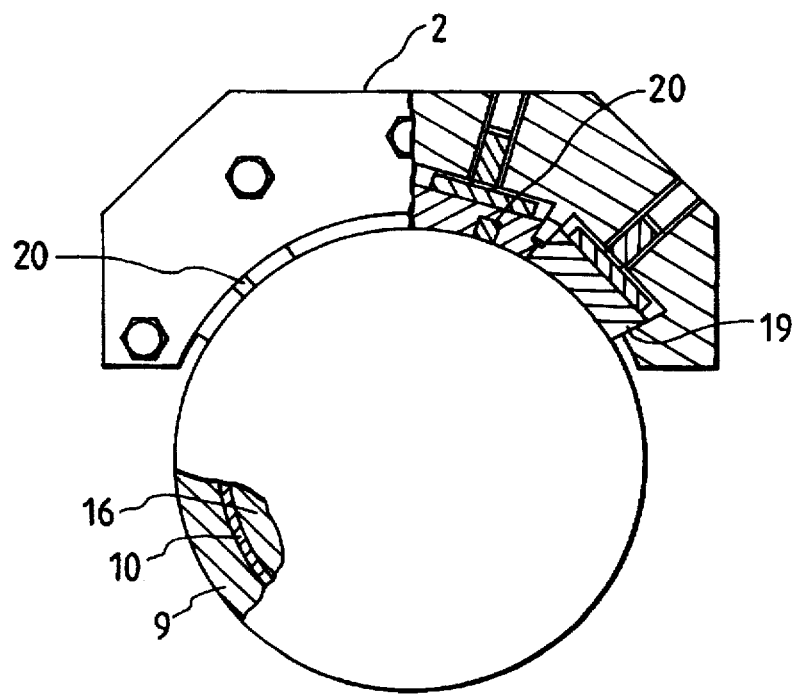
FIG. 5 is a partially cross-sectional enlarged view showing a combination of a sink roll shaft and a roll bearing of the continuous molten zinc dipping apparatus having the slide structure shown in FIG. 1.

FIG. 5 is an assembling view of the roll shaft and the roll bearing having the above stated slide structure in the continuous molten zinc dipping apparatus.

Using this slide structure, a slide test has been actually conducted in the molten zinc bath. The wearing speed of the bearing is less than 0.2 mm/day which is 1/10 of that in a conventional slide structure under the test condition of the zinc bath temperature of 450°–480° C., the roll shaft pressing load of 500 to 2500 kgf, rotating speed of 30–150 $min^{-1}$. The wearing of the sialon material in the roll shaft is hardly observed.

The sliding surface of the slide structure is clean and smooth and has no intermetallic compound such as Fe—Zn attached. Further, the friction coefficient during the sliding movement is less than 0.05 which is less than 1/3 of that in a conventional slide structure.

Embodiment 2

Figure 6:
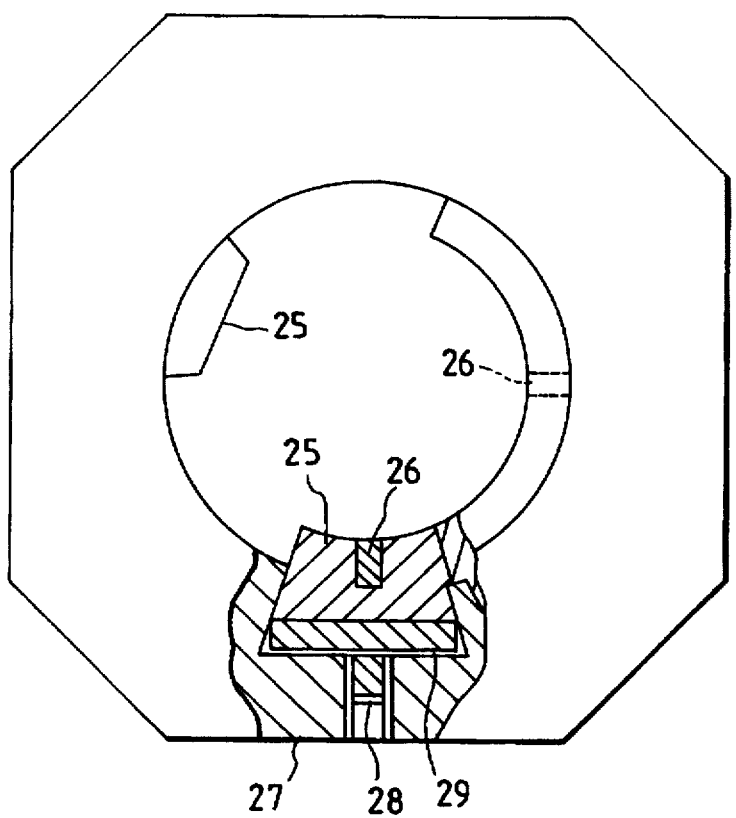
FIG. 6 is an enlarged side view showing another embodiment of a support roll shaft and a roll bearing of the continuous molten zinc dipping apparatus having the slide structure according to the present invention.

FIG. 6 shows another embodiment of a small-size roll bearing for a support roll of the slide structure according to the present invention.

In this embodiment, the materials of the roll bearing and the basic structure are the same as those in Embodiment 1. That is, carbon-carbon reinforcing graphite members 25 are used four (4) pieces in the left upper side and one (1) piece in the right side to construct the sliding portion of the roll shaft.

Further, the cermet bodies 26 of 5 mm in a diameter and 10 mm in a length which are the same as those in Embodiment 1 are implanted or inserted into the carbon-carbon reinforcing graphite members 25 as shown in the figure, five (5) pieces and four (4) pieces, respectively.

The implanted positions of the cermet bodies 26 are arranged in two rows, in the front side and in the back side to the direction of the roll shaft pushing load. The cermet bodies 26 are arranged in two rows as shown in FIG. 4 in such as not to come to the same positions on the peripheral direction.

The carbon-carbon reinforcing graphite members 25 are arranged in one row to the axial direction. The fixing structure for the carbon-carbon reinforcing graphite members 25 in the portion not seen is the same as that shown in the cutaway portion. The carbon-carbon reinforcing graphite members 25 in the left hand side have a flat shape on the inner periphery.

Figure 7:
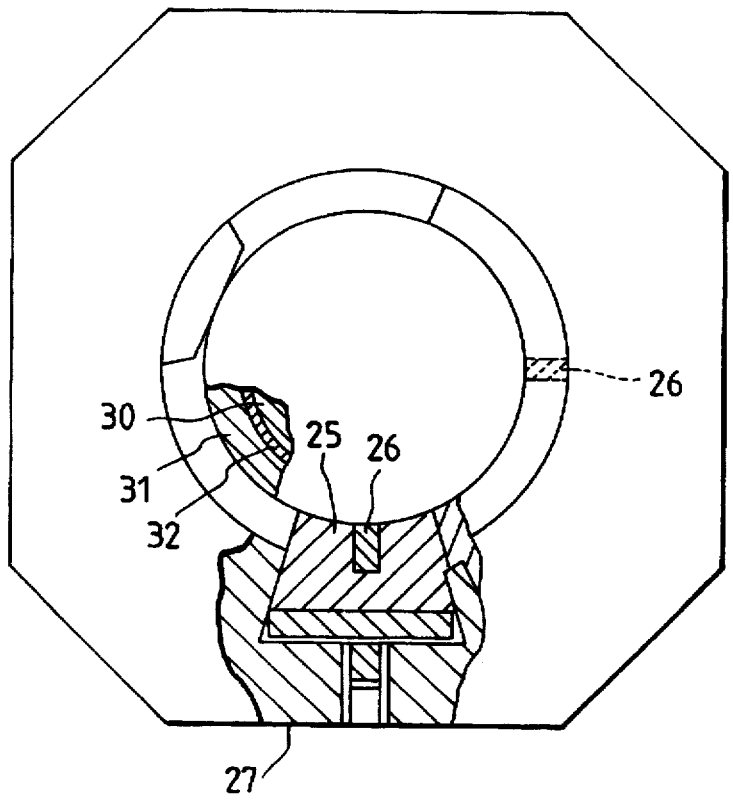
FIG. 7 is a partially cross-sectional enlarged view showing a combination of a support roll shaft and a roll bearing of the continuous molten zinc dipping apparatus having the slide structure shown in FIG. 6.

FIG. 7 is an assembling view of a roll shaft and a roll bearing in the slide structure. In this embodiment, the materials of the roll bearing and the basic structure are the same as those in Embodiment 1.

A diameter of a cylindrical sintered sialon member 31 used in a sliding portion of the roll shaft is 80 mm. A cylindrical sintered sialon member 31 is fixed by wrapping a metallic roll shaft with a stainless pipe made of SUS 316 in a certain length and fastened in the same manner as in Embodiment 1.

A sliding test has been conducted using an actual continuous hot dipping apparatus. In the past, the support roll is driven using an external driving unit. However, by using the roll bearing unit in the slide structure according to the present invention shown in FIG. 6, the support roll can be smoothly rotated without any external driving unit.

As the result, the vibration of the steel strip 7 can be substantially decreased and the deviation in thickness of plating can be decreased to less than one-half of that in the conventional continuous hot dipping apparatus.

After ten days continuous operation of the continuous hot dipping apparatus, the amount of wearing of the roll bearing unit in the slide structure is hardly observed. Further, it is possible to prevent the generation of zebra marks (streaks) caused by the rotating runouts in the support roll.

According to the present invention, by using the sintered ceramics body as the roll shaft having the excellent corrosion resistivity and the wearing resistivity for the sliding portion of the roll shaft and constructing the roll bearing using the reinforcing graphite member such as the carbon-carbon reinforcing graphite member and the cermet, the excellent slide structure can be constituted.

Thereby, it becomes possible to decrease the wearing of the slide structure, to lengthen its service life capable of the continuous operation for the continuous hot dipping apparatus and to decrease the frequency of exchanging the roll bearing unit in the slide structure to improve the productivity in the continuous hot dipping apparatus.

Further, it becomes possible to decrease the wearing of the slide structure in the continuous hot dipping apparatus, to lengthen its service life to be capable of the continuous operation for the continuous hot dipping apparatus of more than five times as long as that of the conventional slide structure in the continuous hot dipping apparatus, to decrease frequency of exchanging the slide structure to improve the productivity in the continuous hot dipping apparatus.

Further, since the support roll is not directly driven to substantially decrease the rotating runouts in the rolls, it becomes possible to improve the quality of the products and to decrease the defective rate by decreasing the deviation in the amount of the plating thickness and by preventing the generation of streaks.

We claim:

1. A slide structure comprising a roll bearing unit having a roll shaft and a roll bearing, wherein a whole circumference of a sliding portion of said roll shaft is made of a sintered ceramics body; and a sliding surface of said roll bearing is formed by a combination of a cermet body as a partial member and a reinforcing graphite member as a base member for supporting said cermet body such that both said cermet body and said reinforcing graphite member form portions of said sliding surface of said roll bearing.

2. A slide structure according to claim 1, wherein said cermet body of said roll bearing is inserted into said reinforcing graphite member and is exposed to said sliding surface of said roll bearing to form a part of said sliding surface of said roll bearing as said partial member.

3. A slide structure according to any one of claims 1 and 2, wherein said reinforcing graphite member of said roll bearing is a carbon-carbon reinforcing graphite member.

4. A slide structure according to any one of claims 1 and 2, wherein said sintered ceramics body of said roll shaft is one selected from a group of one or more of sialon, silicon nitride, silicon carbide, alumina, aluminum nitride, zirconia, boron nitride and cermet.

5. A slide structure according to any one of claims 1 and 2, wherein said cermet body of said roll bearing is formed by sintering at least one kind of a material having a high melting point and high hardness selected from a group of one or more of metal carbides, metal nitrides, metal borides, metal oxides and metal silicides with one selected from group of a metal and an alloy.

6. A slide structure according to claim 1, wherein the hardness of said cermet body at said sliding surface of said roll bearing is smaller than the hardness of said sliding portion of said roll shaft by at least 20%.

7. A continuous hot dipping apparatus having a roll supported with a slide structure comprised of a roll shaft and a roll bearing to rotate in a molten metal bath, wherein a whole circumference of a sliding portion of said roll shaft of said roll is made of a sintered ceramics body; and a sliding surface of said roll bearing is formed by a combination of a cermet body as a partial member and a reinforcing graphite member as a base member for supporting said cermet body such that both said cermet body and said reinforcing graphite member form portions of said sliding surface of said roll bearing.

8. A continuous hot dipping apparatus according to claim 7, wherein said cermet body of said roll bearing is inserted into said reinforcing graphite member and is exposed to said sliding surface of said roll bearing to form a part of said sliding surface of said roll bearing as said partial member.

9. A continuous hot dipping apparatus according to any one of claims 7 and 8, wherein said reinforcing graphite member of said roll bearing is a carbon-carbon reinforcing graphite member.

10. A continuous hot dipping apparatus according to claim 7, wherein the hardness of said cermet body at said sliding surface of said roll bearing is smaller than the hardness of said sliding portion of said roll shaft by at least 20%.

11. A continuous hot dipping apparatus having a sink roll and a support roll supported with a slide structure comprised of a roll shaft and a roll bearing to rotate in a molten metal bath, wherein:

a whole circumference of a sliding portion of said roll shaft is made of a sintered ceramics body; and a sliding surface of said roll bearing is formed by a combination of a cermet body as a partial member and a reinforcing graphite member as a base member for supporting said cermet body such that both said cermet body and said reinforcing graphite member form portions of said sliding surface of said roll bearing.

12. A continuous hot dipping apparatus according to claim 11, wherein said cermet body of said roll bearing is inserted into said reinforcing graphite member and is exposed to said sliding surface of said roll bearing to form a part of said sliding surface of said roll bearing as said partial member.

13. A continuous hot dipping apparatus according to any one of claims 11 and 12, wherein said reinforcing graphite member of said roll bearing is a carbon-carbon reinforcing graphite member.

14. A continuous hot dipping apparatus according to claim 11, wherein the hardness of said cermet body at the sliding surface of said roll bearing is smaller than the hardness of said sliding portion of said roll shaft by at least 20%.

15. A continuous hot dipping apparatus having a sink roll and a support roll supported with a slide structure comprised of a roll shaft and a roll bearing to rotate in a molten metal bath, wherein a whole circumference of a sliding portion of said roll shaft is made of a sintered ceramics body;

a sliding surface of said roll bearing is formed by a combination of a cermet body as a partial member and a carbon-carbon reinforcing graphite member as a base member for supporting said cermet body such that both said cermet body and said reinforcing graphite member form portions of said sliding surface of said roll bearing; and said support roll rotating without any external driving unit.

16. A continuous hot dipping apparatus according to any one of claims 11, 12 and 15, wherein said sintered ceramics body of said roll shaft is one selected from a group of one or more of sialon, silicon nitride, silicon carbide, alumina, aluminum nitride, zirconia, boron nitride and cermet.

17. A continuous hot dipping apparatus according to any one of claims 11, 12 and 15, wherein said cermet body of said roll bearing is formed by sintering at least one kind of a material having a high melting point and high hardness selected from a group of one or more of metal carbides, metal nitrides, metal borides, metal oxides and metal silicides with one selected from a group of a metal or an alloy.

18. A continuous hot dipping apparatus according to claim 15, wherein the hardness of said cermet body at the sliding surface of said roll bearing is smaller than the hardness of said sliding portion of said roll shaft by at least 20%.

* * * * *